UNITED STATES PATENT OFFICE.

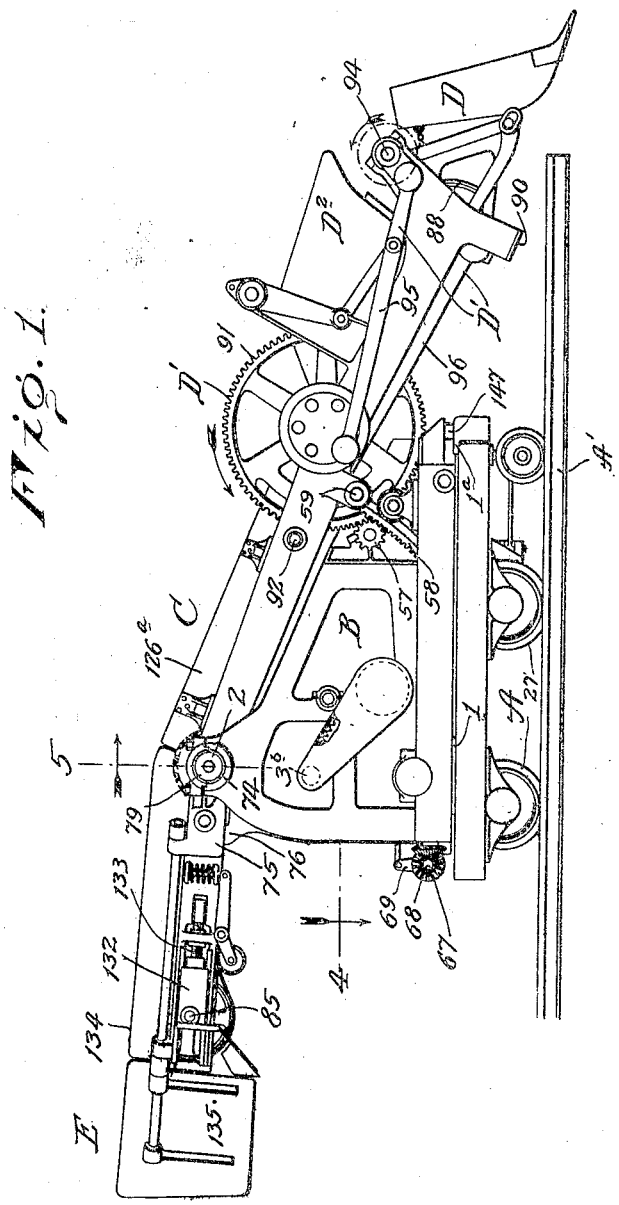

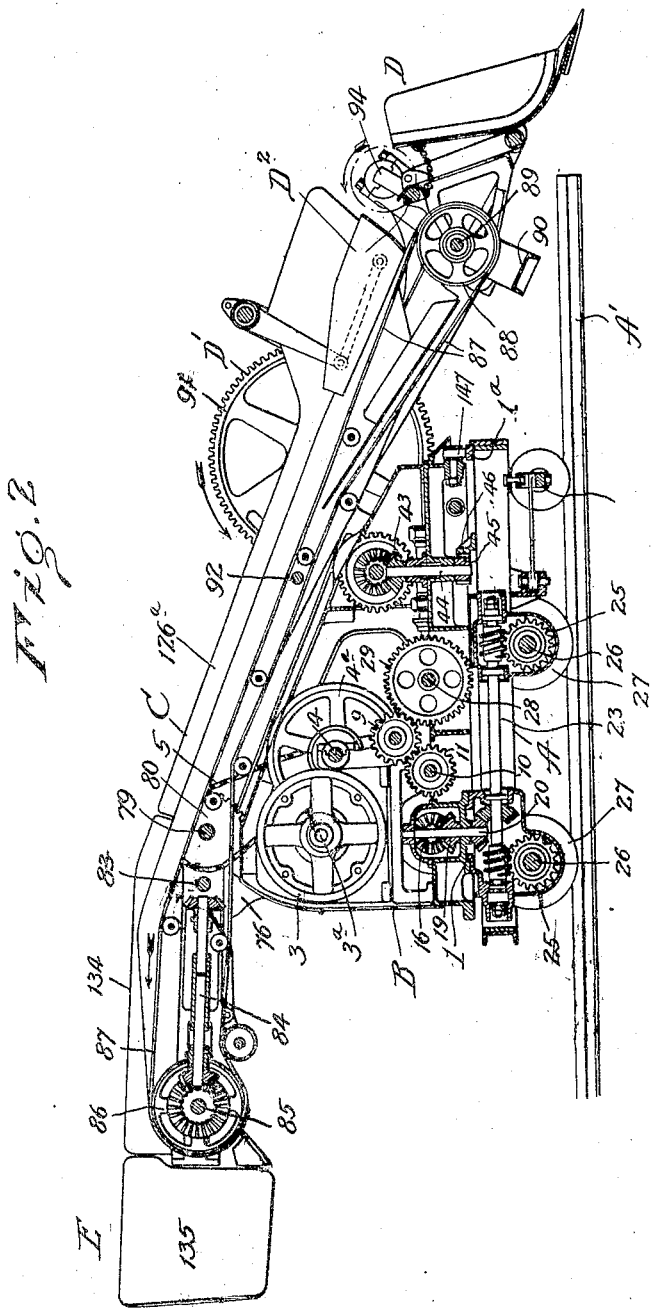

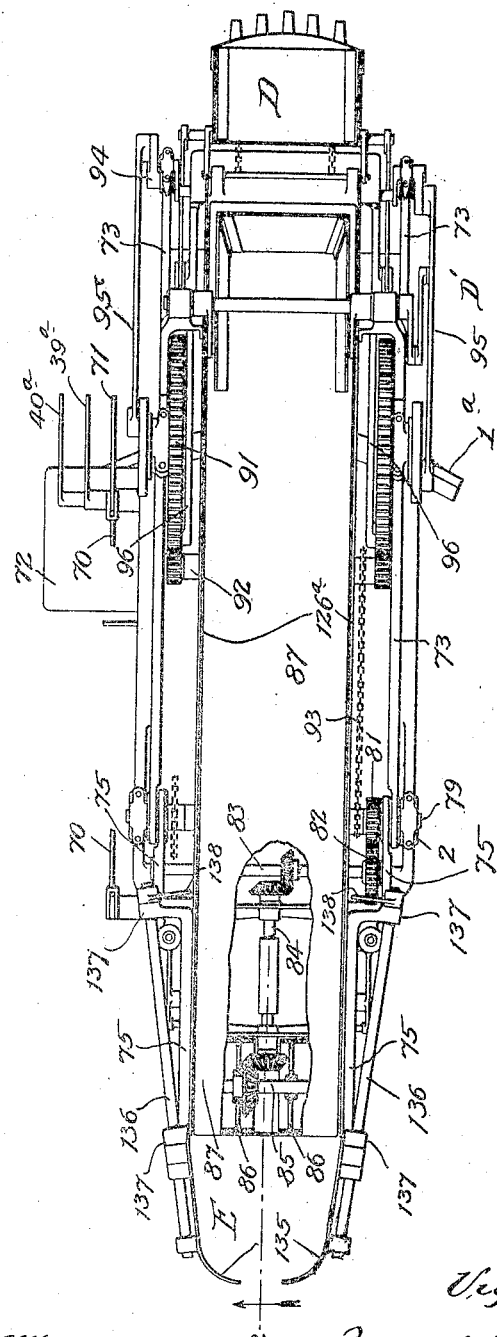

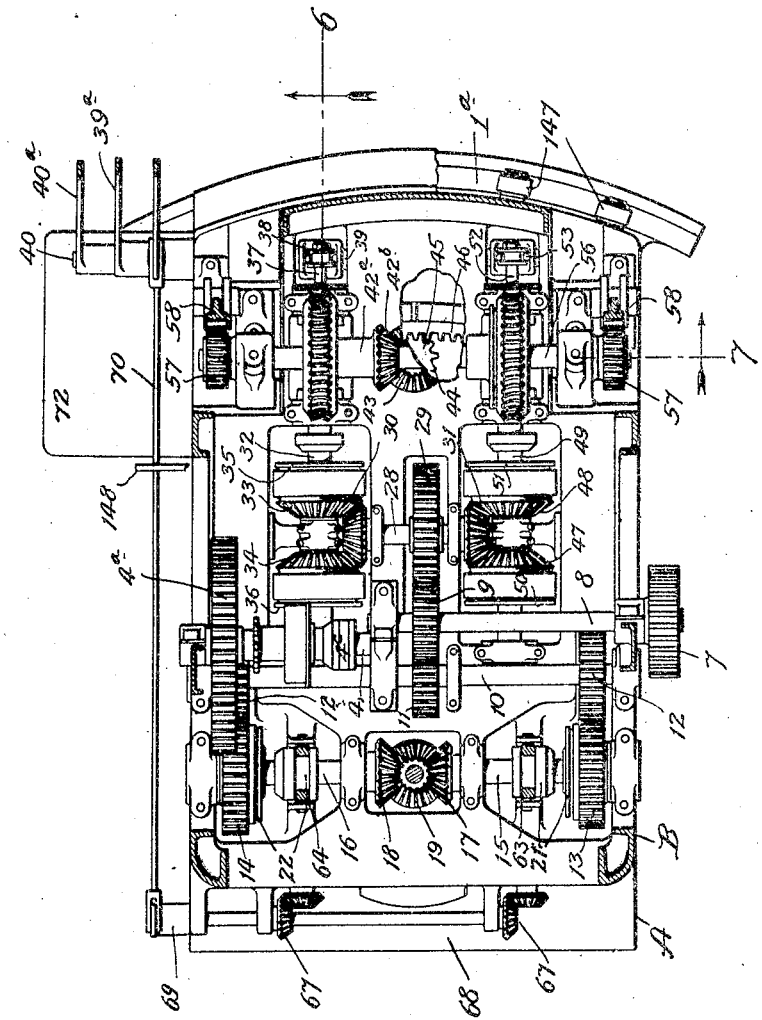

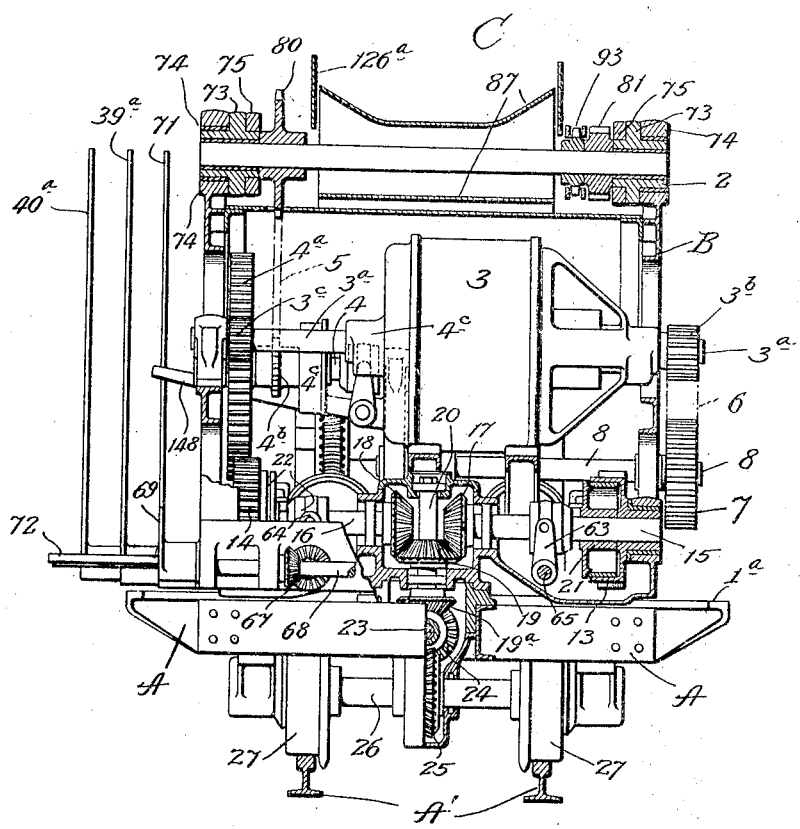

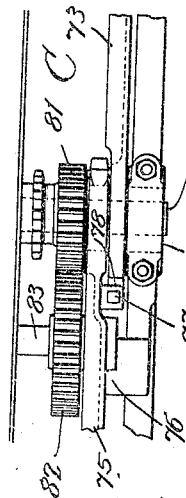
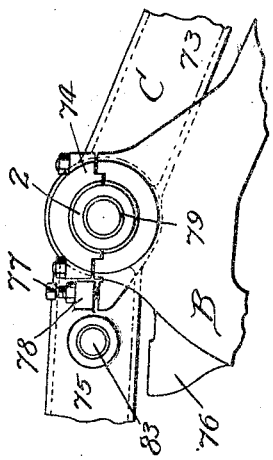
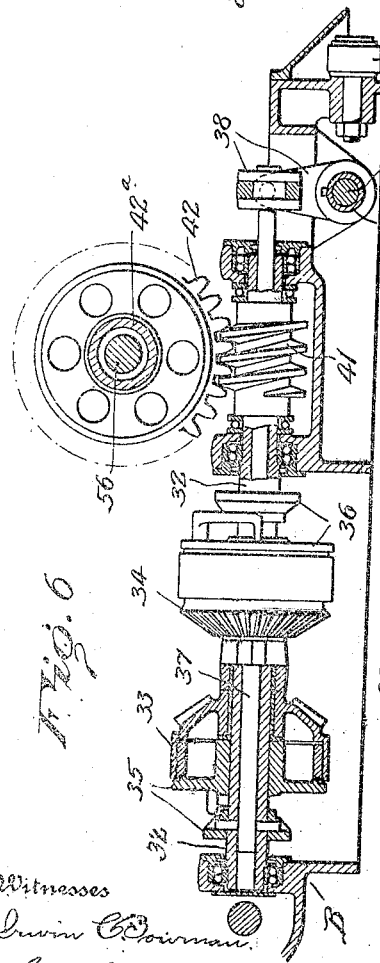
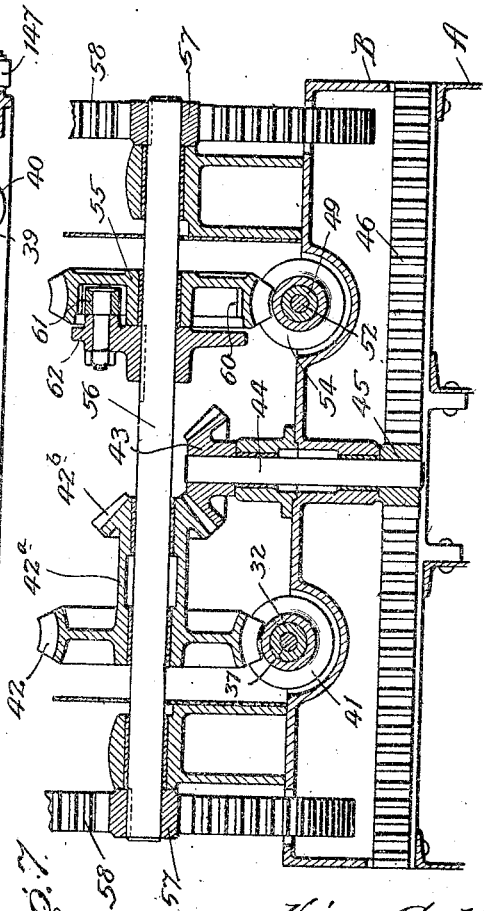

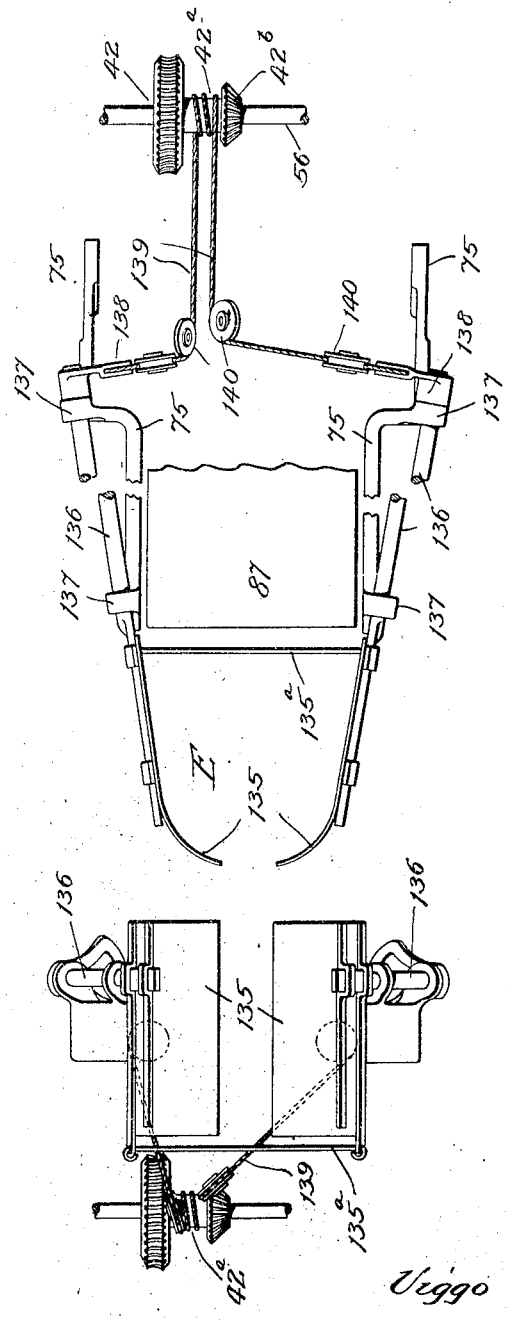

VIGGO G. HALBY, OF MARQUETTE, MICHIGAN, ASSIGNOR TO EUREKA MUCKING & ENGINEERING COMPANY, OF CRYSTAL FALLS, MICHIGAN, A CORPORATION OF MICHIGAN.

LOADER.

1,244,199. Specification of Letters Patent. Patented Oct. 23, 1917.

Original application filed April 26, 1915, Serial No. 24,120. Divided and this application filed March 28, 1916. Serial No. 87,177.

*To all whom it may concern:*

Be it known that I, VIGGO G. HALBY, a citizen of the United States, residing at Marquette, in the county of Marquette and State of Michigan, have invented a new and useful Improvement in Loaders, of which the following is a specification.

This invention relates to machines for loading various materials, such as ore, coal, earth, sand, gravel, or the like.

The present application constitutes a division of my application No. 24,120 filed April 26, 1915.

The present application is directed particularly to the conveyer and discharge mechanism embodied in the machine illustrated, and the accompanying drawings illustrate my improved loader in sufficient detail to enable the invention herein claimed to be understood. The machine illustrated is adapted to operate in mine workings, tunnels, and in analogous situations where the room is limited. While the machine is particularly well adapted for use where the head-room is low, it may be advantageously used in open places for the loading of loose ore, earth, sand, gravel and the like materials; and also for excavating and loading loose earth, sand, gravel and other easily loosened materials.

In the drawings:—

Figure 1 represents a side elevational view of a loader embodying my invention, one part being shown brokenly; Fig. 2, a longitudinal sectional view of the machine, the section being taken as indicated at line 2 of Fig. 3; Fig. 3, a broken plan view of the machine; Fig. 4, a plan sectional view taken as indicated at line 4 of Fig. 1; Fig. 5, a vertical sectional view taken as indicated at line 5 of Fig. 1; Fig. 6, an enlarged longitudinal vertical section taken as indicated at line 6 of Fig. 4; Fig. 7 an enlarged transverse vertical sectional view taken as indicated at line 7 of Fig. 4; Fig. 8, a broken plan view showing a joint with which the conveyer-frame is provided and one of the trunnions connecting the conveyer-mechanism with the intermediate frame or car-body of the machine; Fig. 9, a broken elevational view illustrating the same portion of the machine; Fig. 10, a rear end view of the deflectors or discharge device of the conveyer mechanism, and Fig. 11, a broken plan view, partly diagrammatic, showing the deflectors or discharge device employed at the discharge end of the conveyer.

The machine, in the embodiment illustrated, comprises three main elements, viz., a power-actuated truck A which is mounted on a track $A^1$ and which is at all times within the control of the operator; an intermediate frame or car-body B equipped with power mechanism and which has demountable swivel connection with the rear portion of the truck A, as indicated at 1, and the front end of which may be swung laterally in either direction on a curved track $1^a$ with which the front end of the truck is provided, by mechanism within the control of the operator; and conveyer mechanism demountably connected, by trunnions 2, to the rear upper portion of the triangular intermediate frame B, the frame of said conveyer mechanism being connected with conveyer-tilting mechanism mounted on the front portion of the car-body B.

A shovel D is mounted on the front end of the conveyer mechanism and carried and actuated by shovel-actuating mechanism $D^1$, said shovel being adapted to discharge the materials rearwardly upon the endless-conveyer-belt of the conveyer mechanism C. An oscillating chute or distributer $D^2$ is mounted on the frame of the conveyer mechanism and serves to receive the materials from the shovel and distribute them upon the conveyer belt.

The rear end of the conveyer-frame carries a discharge device E, which in the form illustrated comprises a pair of deflectors which swing upon substantially longitudinal axes and serve to direct the materials in a direction opposite that in which the front end of the conveyer mechanism may be swung when the shovel is being filled. The purpose is to direct the materials, as they are discharged from the conveyer belt, into a burden-car mounted on the track in the rear of the truck A and coupled to the truck.

The truck-frame A and superposed body B are of comparatively short length; and the body B is surmounted by the conveyer mechanism C which has a forwardly and downwardly-inclined front portion which projects in front of the truck, and a substantially horizontal rear portion which overhangs or projects in the rear of the truck.

The truck, the car-body, and the boom or conveyer-frame are made strong and substantial, in order to withstand the stresses when the truck is propelled forwardly, according to the preferred method of operation, whereby the momentum of the machine as a whole may be used to aid in forcing the shovel into the materials in the shovel-filling operation, it being noted, however, that the shovel-actuating mechanism itself operates to carry the shovel through the filling and discharging cycle of operations.

The power-plant is mounted on the intermediate frame or body B. It comprises, in the illustration given, an electric motor 3 (Figs. 2 and 5) mounted on a shaft 3ª, said shaft being equipped at one end with a sprocket or chain-wheel 3ᵇ and at the opposite end with a pinion 3ᶜ; a counter-shaft 4 driven from the pinion 3ᶜ through the medium of a large spur-gear 4ª, the counter-shaft 4 being equipped with a sprocket-wheel 4ᵇ from which power is transmitted through a chain 5 to the endless conveyer, it being noted that the sprocket-wheel 4ᵇ is formed integrally with a sleeve journaled on the shaft 4 and equipped with clutch mechanism 4ᶜ, whereby the sprocket-wheel 4ᵇ may be connected, at will, to rotate with the shaft 4; a sprocket-chain 6 connecting the sprocket-wheel 3ᵇ with a sprocket-wheel 7 secured on the outer end of a shaft 8, the shaft 8 being equipped near the longitudinal center of the machine with a pinion 9, a shaft 10 driven from the pinion 9 by means of a pinion 11; gears 12 secured on the shaft 10 near the ends thereof and serving to rotate gears 13 and 14 which are journaled to turn freely on shafts 15 and 16, whose inner ends are equipped with bevel-gears 17 and 18, which engage an intermediately disposed bevel-gear 19 which is secured to a vertical shaft 20 which is journaled concentric with the swivel connection 1 between the rear end of the truck and the rear end of the body B; clutch-devices 21 and 22, mounted on the shafts 15 and 16 and serving to connect either one of the gears 13 and 14, at will, so as to cause the corresponding shaft 15 or 16 to rotate; a longitudinally-disposed worm-shaft 23 journaled in the truck A and actuated from the bevel-gear 19ª through the medium of a bevel-gear 24, the worm-shaft 23 being equipped with worms which mesh with worm-wheels 25 secured on axles 26 to which the traction-wheels 27 of the truck are secured; a shaft 28 actuated from the spur-gear 9 through the medium of a spur-gear 29, the opposite ends of the shaft 28 being equipped with bevel-gears 30 and 31; mechanism for controlling the lateral swing of the body B about the swivel connection 1, comprising a longitudinal tubular shaft 32 (Figs. 4 and 6); a pair of bevel-gears 33 and 34 actuated by the bevel-gear 30 and journaled to turn freely on the shaft 32, clutch-devices 35 and 36 mounted on the shaft 32 and adapted to connect either one of the gears 33 or 34 with the shaft 32, thereby to cause the shaft 32 to rotate in either direction, at will; a clutch-shifting rod 37 extending through the shaft 32 and which may be shifted by means of an arm or yoke 38 secured on a transversely-extending rock-sleeve 39, which, in turn, is journaled on a rock-shaft 40, the rock-sleeve 39 being controlled by a lever 39ª (Fig. 4) and the rock-shaft 40 being controlled by a lever 40ª; a worm 41 secured on the front portion of the tubular shaft 32 and serving to actuate a worm-wheel 42 which is formed integrally with a sleeve 42ª having a bevel pinion 42ᵇ which meshes with a co-acting pinion 43 secured on the upper end of a vertical shaft 44 whose lower end is equipped with a pinion 45 which engages a curved segmental rack 46 which is fixedly secured to the truck-frame near the front end thereof, as will be understood from Figs. 1 and 5; a pair of bevel-gears 47 and 48 actuated by the bevel pinion 31 and journaled freely on a longitudinal tubular shaft 49, the gears 47 and 48 being controlled by clutch-devices 50 and 51, which are similar to the clutch-devices 35 and 36, and which are actuated by means of the longitudinal clutch-shifting rod 52 controlled by an arm or yoke 53 (Fig. 4) which is secured on the inner extremity of the rock-shaft 40; and a worm 54 secured on the front end of the tubular shaft 49 and which serves to actuate a worm-gear 55 which is journaled on a transverse shaft 56 (Fig. 7), the shaft 56 being equipped at its ends with pinions 57 which engage rack-bars 58 whose upper ends are connected, by pivots 59, with the boom or frame of the conveyer C. The worm-wheel 55 is journaled freely on the shaft 56 and is equipped with internal ratchet-teeth 60 which co-act with a pawl 61 carried by a mounting 62 which is splined on the shaft 56. This form of connection affords a safety feature interposed in the mechanism for raising and lowering the boom, the ratchet-device permitting slippage in the event that the shovel, in its descent, strikes an obstruction, such as would arrest or tend to elevate the front end of the boom.

As has been indicated, the clutches 21 and 22 (Fig. 5) control the propelling mechanism of the machine, that is, the traction mechanism. The clutches 21 and 22 are, in turn, controlled by yokes 63 and 64 carried by longitudinal rock-shafts 65 and 66, which have their rear ends equipped with bevel-gears which engage bevel-gears 67 secured on a transverse rock-shaft 68 which is actuated by an arm 69 joined by a connecting rod 70 to the lever 71.

From the foregoing, it will be understood that the machine is propelled or driven on the track A¹ by propelling mechanism controlled by the lever 71; that the lateral swing of the intermediate frame or car-body on the truck is controlled by the lever 39ᵃ; and that the raising and lowering of the boom is controlled by the lever 40ᵃ—these several levers being conveniently mounted with relation to the platform 72 upon which the operator stands.

The clutch 4ᶜ may be thrown to clutch the sprocket-wheel 4ᵇ to the shaft 4, so that the conveyer driving chain 5 will be continuously operated. Any suitable means as a hand-lever 148, may be employed for operating the clutch 4ᶜ.

The front portion of the frame of the conveyer mechanism C affords a boom, on the front part of which the shovel mechanism is mounted. The boom frame comprises the inclined longitudinal front side-members 73 which are provided at their rear ends with the tubular trunnions 2 which are received in substantial bearings 74 with which the rear upper portion of the intermediate frame or body B is provided; and rear side-members 75 which are pivoted on inward extensions of the trunnions 2. As will be understood from Figs. 8 and 9, the rear portion of the conveyer-frame is adapted to counterbalance, to a large extent, the front portion of the conveyer-frame, or boom. Articulate connections are employed between the frame-members 73 and 75, however; and the construction is such that the counter-balancing effect will be secured until the front end of the boom is raised a certain distance, when the rear frame-member 75 will rest upon shoulders 76 with which the intermediate frame B is provided in the rear of the trunnions 2. The members 75, whose front ends are journaled concentrically with the trunnions 2, are equipped with adjustable stops or set-screws 77 which bear upon shoulders or knuckles 78, with which the members 73 are equipped in the rear of the trunnion connections. Thus, the frame-members 75 will be supported normally, through the medium of the set-screws 77, on the shoulders or short arms of the frame-members 73; but should the front ends of the frame-members 73 be unduly raised, the members 75 would rest upon the shoulders 76, when the rear end of the conveyer is in substantially a horizontal position.

Journaled in the trunnions 2 and concentric therewith is a conveyer-actuating shaft 79 equipped with a sprocket-wheel 80, which is actuated by the sprocket-chain 5. Power is transmitted from the shaft 79, through gears 81 and 82, to a shaft 83 disposed in the rear of the shaft 79 and journaled in the frame-members 75. From the shaft 83 power is transmitted through bevel-gears to an extensible longitudinal shaft 84, the rear end of which is connected by bevel-gears with a transverse shaft 85 which carries the drums 86, upon which the rear end of the endless conveyer 87 is mounted.

The endless conveyer passes over and about suitable idlers, and has its front end mounted on a drum 88 carried by a shaft 89 journaled in short standards carried by a cross-member 90 (Fig. 2) which is secured to the front ends of the side-members 73 of the boom-frame, and as has been indicated, the shovel D is carried by the shovel-actuating mechanism D¹ mounted on the front portion of the boom-frame. The shovel-actuating mechanism includes a pair of large gears 91 supported on the frame-members 73 of the boom and actuated by pinions mounted on a shaft 92 which is actuated from the shaft 79 by a sprocket-chain 93. The shovel-actuating mechanism need not be described in detail. It is sufficient to say that the shovel is carried by a crank-shaft 94 actuated from the gears D¹ by pitmen 95; and as the upper rear end of the shaft is carried in an orbital path by the crank-shaft 94, the shovel is caused to turn about its orbitally-moving pivot by means of thrust-rods 96, which are actuated by the gears 91. The arrangement is such that after the shovel is filled the point-end of the shovel continues to rise, and the materials are discharged through the rear end of the shovel into the distributer D², by means of which they are distributed on the conveyer belt.

The shaft 85, which carries the drum about which the upper end of the endless conveyer passes, is mounted in adjustable bearings 132 carried by the rear frame-members 75 of the conveyer-frame, the bearings 132 being adjusted by means of adjusting-devices 133. This enables the proper tension to be given to the conveyer-belt, and it will be understood that the extensible shaft 84, through which motion is communicated to the shaft 85, has its length automatically adjusted in accordance with the adjustment of the bearings 132. Corresponding with the sheet metal side-pieces 126ᵃ, the rear portion of the conveyer-frame is equipped with sheet metal side-pieces 134, which project upwardly from the edges of the conveyer-belt. The upper or operative portion of the conveyer-belt is preferably so supported on idlers as to curve the belt in cross-section, in the manner illustrated in Fig. 5, thus tending to keep the materials on the belt.

As will be understood from Figs. 1, 10 and 11, the rear end of the conveyer-frame is preferably equipped with a pair of guide-members or chute-members 135, which are automatically swung upon longitudinal, substantially horizontal axes, so that the lower ends of the members or deflectors 135 will point in the opposite direction from the direction in which the rear end of the conveyer swings when the intermediate frame or car-body B has its front end swung laterally to direct the shovel to one side or the other of the track. The purpose of the deflectors 135 is to direct the materials discharged from the rear end of the conveyer-belt toward the center of the car which is being filled, regardless of the lateral swing of the rear end of the conveyer. Each member 135 is fixedly secured to a shaft 136 mounted in bearings 137 with which the rear members 75 of the conveyer-frame are equipped. The front ends of the shafts 136 are fitted with arms or segments 138, by means of which the shafts may be turned. A rope or flexible connection 139 passes about the drum or sleeve 42ª, which forms a part of the mechanism for swinging the intermediate frame B laterally; and the ends of this rope, after passing about suitable guide-rollers 140, are connected with the arms or segments 138. The arrangement is such that when the drum 42ª is turned in such direction as to swing the rear end of the conveyer mechanism to one side of the track, the deflectors 135 will be given such inclination as to cause their lower ends to point in the direction opposite that in which the rear end of the conveyer has been swung. When the conveyer is swung in the opposite direction, the deflector-members 135 are given an opposite inclination. The result is to direct the materials to the center of a burden-car (none shown) which may be located on the track A¹ beneath the discharge-spout or deflectors 135. These members are connected at their lower edges by a link 135ª, so that they will swing together in one direction or the other, depending upon which portion of the rope 139 is being wound upon the drum 42ª.

The operation may be described briefly:

The operator stands on the platform 72, within convenient reach of the controlling levers of the machine. After starting the motor 3, the clutch 4ᶜ is operated to connect the sprocket-wheel 4ᵇ with the continuously rotating shaft 4. The clutch 4ᶜ is shifted by the lever 148. Power is communicated through the sprocket-chain 5 and imparts continuous motion to the endless conveyer and the shovel-actuating mechanism, it being noted that power is transmitted through the sprocket-chain 93 and shaft 92, so that the main gear wheels 91 will be continuously rotated, thus actuating the shovel. The shovel is filled, inverted, and discharged through the reciprocating-member E on to the front end of the conveyer-belt.

The operator controls the traction mechanism in such manner as to cause the machine to move forward at the moment that the shovel enters the materials, so that the momentum of the machine is added to the thrust imparted to the shovel by the shovel-actuating mechanism. Thus, the machine is periodically retracted and advanced, this action being timed to correspond with the action of the shovel, so that the whole machine is given a chugging action which greatly aids in the operation of filling the shovel. The propelling mechanism of the machine is controlled by the lever 71, which controls the clutches 21 and 22, in the manner hereinbefore described. The operator controls the lateral swing of the intermediate frame or body B by means of the lever 39ª, which controls the clutches 35 and 36, which regulate the direction of rotation of the worm-wheel 42 and the consequent direction of rotation of the vertical shaft 44, whose pinion 45 meshes with the rack 46. By this mechanism, the boom is swung laterally in either direction to enable the shovel to follow and gather the materials. The raising and lowering of the front end of the boom is controlled by the lever 40ʰ, which controls the clutches 50 and 51, which regulate the direction of rotation of the worm-wheel 55, it having been explained that power is communicated from the worm-wheel 55 to the pinion-equipped shaft 56 which operates the racks 58. The racks 58 are struck on a radius from the axis 79 about which the boom swings, and the rack 46, which forms a part of the mechanism for swinging the intermediate frame B laterally, is struck on a radius from the axis of the swivel 1, which is also true of the segmental track 1ª. The front end of the intermediate frame B is equipped with rollers 147, which travel on the track 1ª, as illustrated in Fig. 4.

When the front end of the conveyer is turned to one side of the track, the discharge device E carried by the rear end of the conveyer mechanism is turned in such direction as to counteract the effect of swinging the conveyer mechanism laterally, so that the discharging materials will be directed to the center of the track and will fall in the burden-car mounted on the track in the rear of the shoveling machine. This movement of the deflectors composing the discharge mechanism E is automatically controlled, as has been described.

The machine described is compact, powerful and easily controlled. The machine may be operated where the head room is low; and the capacity of the machine for shoveling and loading is large. The use of the deflectors as a discharge device at the rear end of the machine enables the materials to be directed to the burden-car, notwithstanding the machine employs but a single endless conveyer.

The foregoing detailed description has been given for clearness of understanding only, and no unnecessary limitation should be understood therefrom, but the appended claims should be construed as broadly as permissible in view of the prior art.

What I regard as new, and desire to secure by Letters Patent, is:—

1. In a loader, the combination of a truck, a conveyer-frame mounted thereon, mechanism for causing the front end of the conveyer-frame to swing laterally, and automatically actuated discharge mechanism operating to direct the materials discharged from the conveyer mechanism toward a central point, regardless of the position of the conveyer mechanism.

2. In a loader, the combination of a truck, a laterally-swinging frame mounted thereon, conveyer mechanism mounted on said laterally-swinging frame, mechanism for swinging the laterally-swinging frame, a discharge device carried by the rear portion of the conveyer, and means for automatically varying the position of the discharge device to counteract the effect of the lateral swing of the conveyer mechanism, for the purpose set forth.

3. In a loader, the combination of a truck, a laterally-swinging frame mounted thereon, a conveyer-frame mounted on said laterally-swinging frame, mechanism for swinging the laterally-swinging frame, chute-members connected with the rear portion of the conveyer, and means for changing the inclination of said chute-members in the operation of swinging said laterally-swinging frame.

4. In a loader, the combination of a truck, an intermediate frame swiveled thereon, a conveyer-frame mounted on said intermediate frame and comprising an inclined front-section projecting in front of the truck and a rear section projecting in the rear of the truck, mechanism for swinging the front end of said intermediate frame laterally, chute-members carried by longitudinal pivots mounted at the rear end of the rear conveyer-section, and means for changing the inclination of said chute-members in the operation of swinging said intermediate frame laterally.

VIGGO G. HALBY.